Patented June 20, 1950

2,511,895

UNITED STATES PATENT OFFICE 2,511,895

AQUEOUS DISPERSION OF GLYCOL-PHTHALATE-ADIPATE

Osborne Coster Bacon, Penns Grove, N. J., assignor to E. I. du Pont de Nemours & Company, Wilmington, Del., a corporation of Delaware No Drawing. Application March 5, 1948,
Serial No. 13,347

4 Claims. (Cl. 260—29.6)

This invention relates to a novel composition of matter useful in the art of finishing textiles. More particularly, this invention deals with a novel aqueous dispersion of a particular type of alkyd resin, as hereinbelow defined, and with a process of producing such aqueous dispersion in stable form.

The alkyd resin with which this invention is particularly concerned is a resinous condensation product of phthalic anhydride, adipic acid and ethylene glycol, in which the phthalic anhydride component predominates. More particularly, I am concerned here with resins of the above three components in which the initial molal ratio of adipic acid to phthalic anhydride is from $5/95$ to $15/85$. The initial mixture for condensation contains enough ethylene glycol to substantially neutralize all the COOH groups, so that the acid number of the resulting resin is very low, say between 10 and 20. The size of the average resin molecule is controlled by the duration of the reaction (heating) and is generally indicated by the flow point (sometimes referred to as the melting point) of the resin. The preferred resin for the objects of this invention begins to flow at temperatures between 60 and 90° C.

It has been found that an alkyd resin of the aforegoing composition and specifications has excellent bodying or stiffening properties when applied as a textile finishing agent. When it is considered that this resin further possesses the quality of transparency and relative freedom from color, the resin becomes of extreme interest as a starch substitute for the finishing of textiles. The problem is: how to produce a stable aqueous dispersion of this resin.

In order to apply the above resin to textiles, it is preferred to work with aqueous dispersions, rather than with organic solvent solutions, because of the fire hazards and toxicity from organic solvents in textile plants. In order to obtain maximum utility with an aqueous dispersion, it is necessary that the product be compatible with acids, alkalies, salts of polyvalent metals, including heavy metals, and with both anionic or cationic surface active agents, since any of these materials may be encountered in the textile finishing art.

The problem of emulsifying the selected ethylene - glycol - phthalate - ethylene - glycol- adipic resin is particularly difficult because of its high melting point and low acid number.

It will be noted here that the problem of dispersing in water alkyd resins in general is by no means new to the art. Various attempts have been made with respect to alkyd resins having various physical and chemical properties; the solution to each problem, however, is generally specific to resins of that particular set of physical and chemical properties or else it may fall short in satisfying the various stability or compatibility requirements hereinabove set forth. Thus, resins having acid numbers above 100 are generally soluble or dispersible in aqueous solutions of alkalies. Resins having an acid number much below 100 require an additional dispersing agent to maintain a stable dispersion. The prior art discloses examples of alkyd resin dispersions stabilized with alkali soluble dispersing agents especially casein. Dispersions of this type are not compatible with aqueous solutions of acids, acid salts, heavy metal salts, aldehydes and other agents commonly used in the textile industry, where alkyd resin dispersions find wide application as finishing agents for fabrics. The use of protein materials also involves the danger of putrefaction causing bad odors or discoloration. The prior art does not describe a dispersion of a low-acid-number alkyd resin having none of the above disadvantages.

Accordingly, it is an object of this invention to provide a method for producing aqueous dispersions of the aforegoing resin, which dispersions shall possess satisfactory stability in storage and shall possess the various compatibilities above noted. Other and further important objects of this invention will appear as the description proceeds.

Now according to this invention, the above problem of dispersing the said alkyd resin has been solved by using a carefully selected, partially saponified polyvinyl acetate, as more fully defined hereinbelow, as the dispersing agent. This invention also employs a special process of preparing the dispersion, which involves incorporation of the partially saponified polyvinyl acetate in the presence of ammonia with viscous milling, under carefully controlled conditions.

For a better understanding of the limitations imposed herein on the selection of the dispersing agent, it must be observed here that the term "polyvinyl alcohol" has often been used in the art to cover a wide range of chemical compounds varying considerably in molecular weight, solubility, viscosity of solution and saponification number. This difficulty arises from the fact that polyvinyl alcohol can only be prepared by hydrolyzing a polyvinyl ester. Polyvinyl acetate is the ester usually started with.

The properties of hydrolyzed polyvinyl acetate depend upon the molecular weight of the polyvinyl acetate employed and the degree of hydrolysis. Commercial "polyvinyl alcohols" vary from comparatively low molecular weight to high molecular weight materials. Products of different molecular weight having the same degree of hydrolysis produce solutions varying widely in viscosity. The degree of hydrolysis may be designated by a saponification number. A true polyvinyl alcohol is 100% hydrolyzed and, therefore, has a saponification number of 0. True polyvinyl alcohols and partially saponified polyvinyl acetates vary radially in solubility. Approximate classifications are:

| Percent Hydrolyzed | Solubility Characteristic |
| --- | --- |
| 20–70 | Soluble in mixtures of alcohol and water. |
| 70–80 | Soluble in cold water; precipitate on heating. |
| 80–95 | Soluble in cold and hot water. |
| 95–100 | Soluble in hot water; remain in solution on cooling. |

Now, although the prior art makes occasional references to the use of polyvinyl alcohol (at random) as a dispersing agent for various specific resins, I have found that true polyvinyl alcohols will not stabilize dispersions of the alkyd resin described in this invention. A number of partially saponified polyvinyl acetates have also been tried by me without success.

The process of this invention rests on the surprising discovery that the alkyd resins hereinabove specified may be successfully dispersed and stabilized if one employs a special, partially saponified polyvinyl acetate, namely one having the following characteristics: Saponification number between 127 and 200; viscosity between 40 and 50 cp. The viscosity herein mentioned (and at all other places hereinbelow) is that of a 4% aqueous solution, at 20° C., as measured by a Hoeppler viscosimeter (Chem. Zeit., vol. 57, pp. 62-63; 1933), and is expressed in centipoises.

The process of preparing the dispersion also requires careful attention, and involves the following sequence of steps: The resin is mixed with aqueous ammonia at about 75 to 95° C. in a heavy duty mixer capable of producing viscous milling. The partially saponified polyvinyl acetate, dissolved in water and heated to about 75° C., is added with viscous milling to form an essentially water-in-oil type emulsion. If desired, an aqueous dispersion of a colloidal clay, such as bentonite, may be added at this stage, while continuing milling. The emulsion is then cooled to about 50 to 55° C., after which water and acetic acid are added slowly to invert the suspension from the water-in-oil type to an oil-in-water type.

If desired, cationic dispersing agents may be added to the final dispersion. The effect of this is to make the aqueous composition substantive to textile fibers enabling the same to be treated by a process wherein exhaustion of the bath is preferred as distinguished from straight padding.

Without limiting this invention, the following examples are given to illustrate my preferred mode of operation. Parts mentioned are by weight.

EXAMPLE 1

*Materials employed*

| | Parts |
| --- | --- |
| Alkyd resin (acid number of 13; flow point about 75° C.; 90% ethylene glycol phthalate; 10% ethylene glycol adipate) | 30.00 |
| Ammonium hydroxide (14% NH₃) | 10.00 |
| Partially saponified polyvinyl acetate (saponification number 160 to 180, 83 to 86% hydrolyzed; viscosity (4% in water at 20° C.) of approximately 42 centipoises) | 3.00 |
| Bentonite (optional) | 0.25 |
| Acetic acid (28% solution) | 5.00 |
| Water | 52 or 51.75 |
| | 100.00 |

*Procedure*

Add the resin to a heavy-duty, kneading-type mixer (W. P.) and heat while mixing to 85–90° C.

Add approximately 75% of the aqueous ammonia at intervals over a 5-minute period and continue mixing until a homogeneous, viscous, smooth paste is obtained (usually after 2 to 3 additional minutes). Add the remainder of the aqueous ammonia and mix until the charge is homogeneous (usually after 2 to 3 minutes).

Dissolve the 3 parts of partially saponified polyvinyl acetate in 30 parts of water, by mixing efficiently at room temperature with a high speed agitator, followed by heating to 75° C. while continuing agitation.

The hot aqueous solution of the partially saponified polyvinyl acetate is now dumped into the mixer and the mass is kneaded vigorously to insure speedy homogenization.

If it is desired to include a colloidal clay into the system, a dispersion of 0.25 part of bentonite in 3 parts of water is added at this point.

Whether the bentonite is added or not, the vigorous mixing of the mass is continued until a homogeneous, smooth paste is obtained (usually after 5 to 10 minutes). At this point the mass is predominantly a water-in-oil type emulsion.

Cool now the mixture to 50°–55° C. while continuing agitation. Then dilute the 5 parts of 28% acetic acid with the remaining 18.5 or 18.25 parts of water at room temperature and add slowly to the mixer while continuing agitation. A fluid, oil-in-water type dispersion is obtained. The particle size is predominantly less than 1 micron with a maximum of 3 microns. The addition of the acid solution can be made to the hot mix at 75–80° C. before cooling, but the preferred practice is to cool the mixture below the flow point of the resin (about 75° C.) before adding the acid. Water can be added before the acid addition, and, if the resin concentration is reduced to a maximum of 40%, stronger solutions of acid can be used in the neutralization step.

The aqueous dispersion of resin which is obtained is stable for several months (at least 6 months). It is compatible with acids including strong mineral acids (but excepting boric acid, which is well known for its incompatibility with polyvinyl alcohols), acid salts, salts of heavy metals, aluminum salts, anionic, cationic and non-ionic surface active agents. The dispersion is also compatible with most alkalies, excluding borax.

Example 2

Dispersions were prepared as in Example 1, except for variations in the dispersing agent to determine the operative range of the dispersing agent required. The results obtained were as follows:

| Partially Saponified Polyvinyl Acetate | | | Stability of Dispersion |
|---|---|---|---|
| Sap. No. | Percent Hydrolyzed | Viscosity, Cp. | |
| 0–18 | 98–100 | 24 | Very poor. |
| 94–116 | 90–92 | 22 | Poor. |
| 127–157 | 86–89 | 22 | Do. |
| 127–157 | 86–89 | 42 | Good. |
| 160–180 | 83–86 | 42 | Excellent. |
| 223–249 | 76–79 | 31 | Poor. |
| 223–249 | 76–79 | 70 | Do. |

From these and similar experiments it may be concluded that a relatively high molecular weight polyvinyl acetate (viscosity 40 to 50 cp.), hydrolyzed to an extent of 80% to 89%, is required to stabilize a dispersion of the resin used in this invention.

Example 3

The following example illustrates the preparation of a cationic resin dispersion from the product of Example 1.

To 92 parts of the product from Example 1, add first 3 parts of a 22% basic aluminum formate solution in water, and then 0.5 part of octadecyl trimethyl ammonium bromide dissolved in 4.5 parts of water. The addition of these reagents is made at room temperature with slow but efficient mixing. A resin dispersion is obtained which has a pronounced affinity for textiles as exemplified by its preferential adsorption on the textile fiber from a dilute aqueous bath.

It will be understood that while the above examples are very specific, and indicate my preferred form of carrying out this invention, the details thereof may nevertheless be varied within certain limits, as will be readily understood by those engaged in this art. A further conception of the permissible range of variations may be obtained from the following discussion.

The alkyd resin used was selected because of its light color, low acid number (between 10 and 20) and high flow point (75° C.). For convenience, the alkyd resin is described as made up of ethylene-glycol-phthalate and ethylene-glycol-adipate. Actually it is very improbable that the resin is entirely a mixture of these two resins. The resin is prepared from a mixture of ethylene glycol, phthalic anhydride and adipic acid and both acids are probably combined with most ethylene glycol molecules. In Example 1 above, I used a resin prepared from 90 parts of phthalic anhydride, 10 parts of adipic acid and 40 to 42 parts of ethylene glycol. But these components may be varied so as to give a resin composition corresponding to between 85% to 95% of ethylene-glycol-phthalate and 15% to 5% of ethylene-glycol-adipate. Resins within this range of composition and having an acid number of 10 to 20 are satisfactory.

The concentration of resin in the dispersion is not critical. The concentrations of resin may vary between 20% and 50%, the preferred concentration lies between 30% and 35%. The concentration of the partially saponified polyvinyl acetate is largely determined by the amount of resin in the dispersion. Satisfactory ratios of dispersing agent to resin are between 1 to 5 and 1 to 20. More dispersing agent does not improve the stability of the dispersion and less impairs the stability. Aqueous solutions of the partially saponified polyvinyl acetate are sometimes turbid due to impurities. Such solutions should be clarified by filtration before use.

Other acids than acetic acid may be employed to neutralize the $NH_3$ in the dispersion of this invention; for example formic acid, tartaric acid, hydrochloric acid. In fact, the only acid which could not be used is boric acid, which breaks the dispersion. Acetic acid and formic acid are the preferred acids. Strong mineral acids are not especially recommended due to their injurious action upon cotton fibers. In summary then, any acid may be used except those which are known to be injurious to the fiber intended to be treated or which are known to be incompatible with polyvinyl alcohols.

It will be clear by now that my invention relates to a field of great practical importance and was not to be foreseen from anything disclosed in the art.

The product of this invention is used for application to fibrous materials to impart fullness of handle and stiffness.

The advantages of the invention are:

1. Dispersions prepared according to this invention are stable under conditions where the older alkaline dispersions are unstable. Neutral or acid finishes, for example, are frequently required for use on textiles containing dyes sensitive to alkalies. It is also sometimes desirable to mix an alkyd resin dispersion with other materials which are acid or contain metallic salts, for example, wax-aluminum-acetate compositions as used to impart water repellent effects.

2. Acidic resin dispersions containing aluminum or zirconium acetate with a cationic active agent can be applied to textiles including cotton, rayon, wool, silk, and nylon by a process of preferential adsorption from a dilute application bath to obtain full, well-bodied, firm finishes. None of the dispersing agents of the prior art for alkyd type resins can be used to prepare these stable acidic, cationic dispersions.

3. The dispersing agent used in this invention does not become discolored or develop undesirable odors when applied to fibrous materials and stored or used for long periods of time.

In the claims below, where the viscosity of the polyvinyl agent is numerically specified, it will be understood that the number represents the viscosity in centipoises ("cp.") of a 4% solution aqueous solution of the polymer at 20° C., as determined by a Hoeppler viscosimeter.

I claim as my invention:

1. A composition of matter comprising a uniform, stable, aqueous dispersion of the following principal ingredients: (1) an alkyd resin being the resinous condensation product of phthalic anhydride, adipic acid and ethylene glycol in which the initial ratio of adipic acid to phthalic anhydride is from $5/95$ to $15/85$ by weight, said alkyd resin having an acid number between 10 and 20 and a melting point between 60° and 90° C.; (2) a partialy saponified polyvinyl acetate having a viscosity of 40 to 50 cp. and having a saponification number between 127 and 200; the concentration of said alkyd resin in the system being between 20 and 50% by weight, and the ratio of said saponified polyvinyl acetate to alkyd resin being from $1/20$ to $1/5$ by weight.

2. A textile treating agent comprising a stable aqueous system, which contains in uniform distribution the following principal ingredients: (1) an alkyd resin obtained by condensing substantially 90 parts of phthalic anhydride, 10 parts of adipic acid and from 40 to 42 parts of ethylene glycol to yield a resin having an acid number of about 13 and a flow point of about 75° C.; (2) a partially saponified polyvinyl acetate having a viscosity of about 42 cp. and a saponification number of about 160 to 180; the concentration of said alkyd resin in the system being from 20 to 50% by weight, and the weight of said saponified polyvinyl acetate being about 0.1 times the weight of said alkyd resin in the system.

3. The process of producing a stable aqueous dispersion of an alkyd resin as defined in claim 1, which comprises heating said resin with aqueous ammonium hydroxide to a temperature of about 75 to 95° C., adding to said paste an aqueous solution of a partially saponified polyvinyl acetate as defined in claim 1 and kneading the mass until a water-in-oil emulsion is formed; then adding an aqueous acid in quantity sufficient to neutralize the ammonia and to effect inversion, and continuing agitation until the emulsion has been inverted, forming a suspension of the resin-phase in water.

4. A process as in claim 3, including the further step of adding an aqueous suspension of a colloidal clay prior to incorporation of the acid.

OSBORNE COSTER BACON.

REFERENCES CITED

The following references are of record in the file of this patent:

UNITED STATES PATENTS

| Number | Name | Date |
|---|---|---|
| 1,897,260 | Kienle et al. | Feb. 14, 1933 |
| 2,295,699 | Thackston | Sept. 15, 1942 |
| 2,334,107 | Light et al. | Nov. 9, 1943 |
| 2,343,091 | Smith | Feb. 29, 1944 |
| 2,420,295 | Biehn | May 13, 1947 |

OTHER REFERENCES

"Elvanol Polyvinyl Alcohols," pp. 4, 5, 6, 20, 21 and 44, pub., 1937, by Du Pont, Wilmington, Del.

PVA Polyvinyl Alcohol, pages 2 and 5, pub., 1940, by R and H Chem. Dept., Du Pont, Wilmington, Del.

Du Pont Tech. Data Bulletin No. A-4935, one sheet, received Jan. 29, 1948, pub. by Electrochem. Dept. Dupont.

Du Pont Vinyl Products Bulletin V12-1447, pages 1 and 8, received Jan. 29, 1948, pub. by Electrochem Dept. Du Pont.